May 29, 1928. 1,671,286
C. H. HAPGOOD
WEIGHING SCALE
Filed July 19, 1924 3 Sheets-Sheet 3
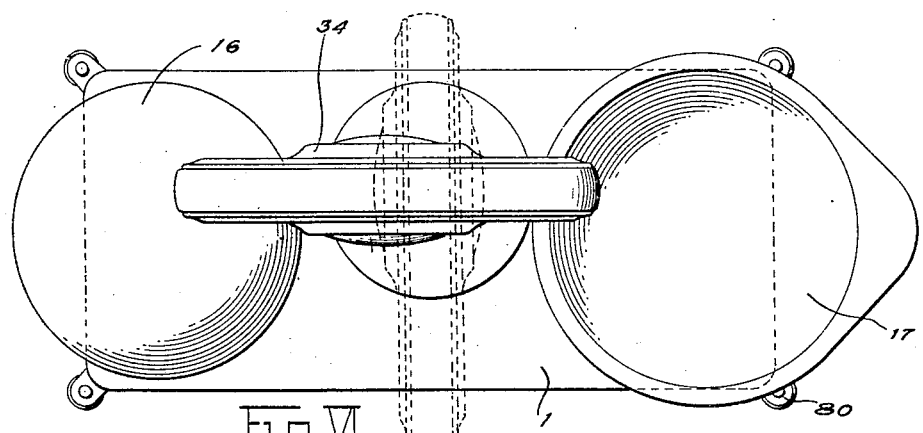
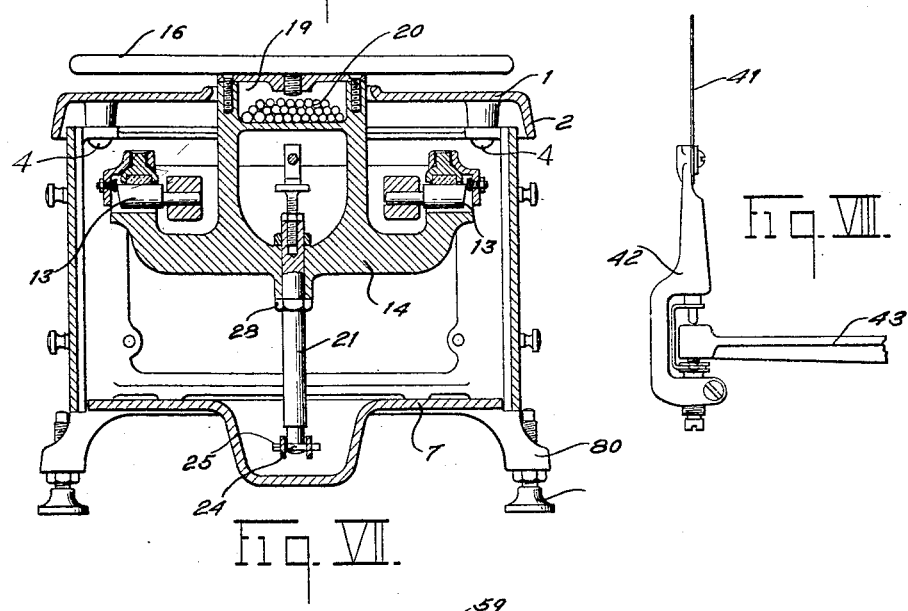
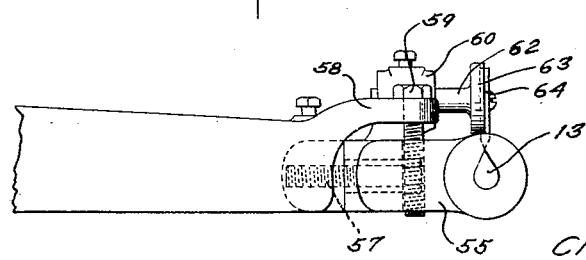
Inventor
Clarence H. Hapgood.
By C. Marshall
Attorney Patented May 29, 1928.

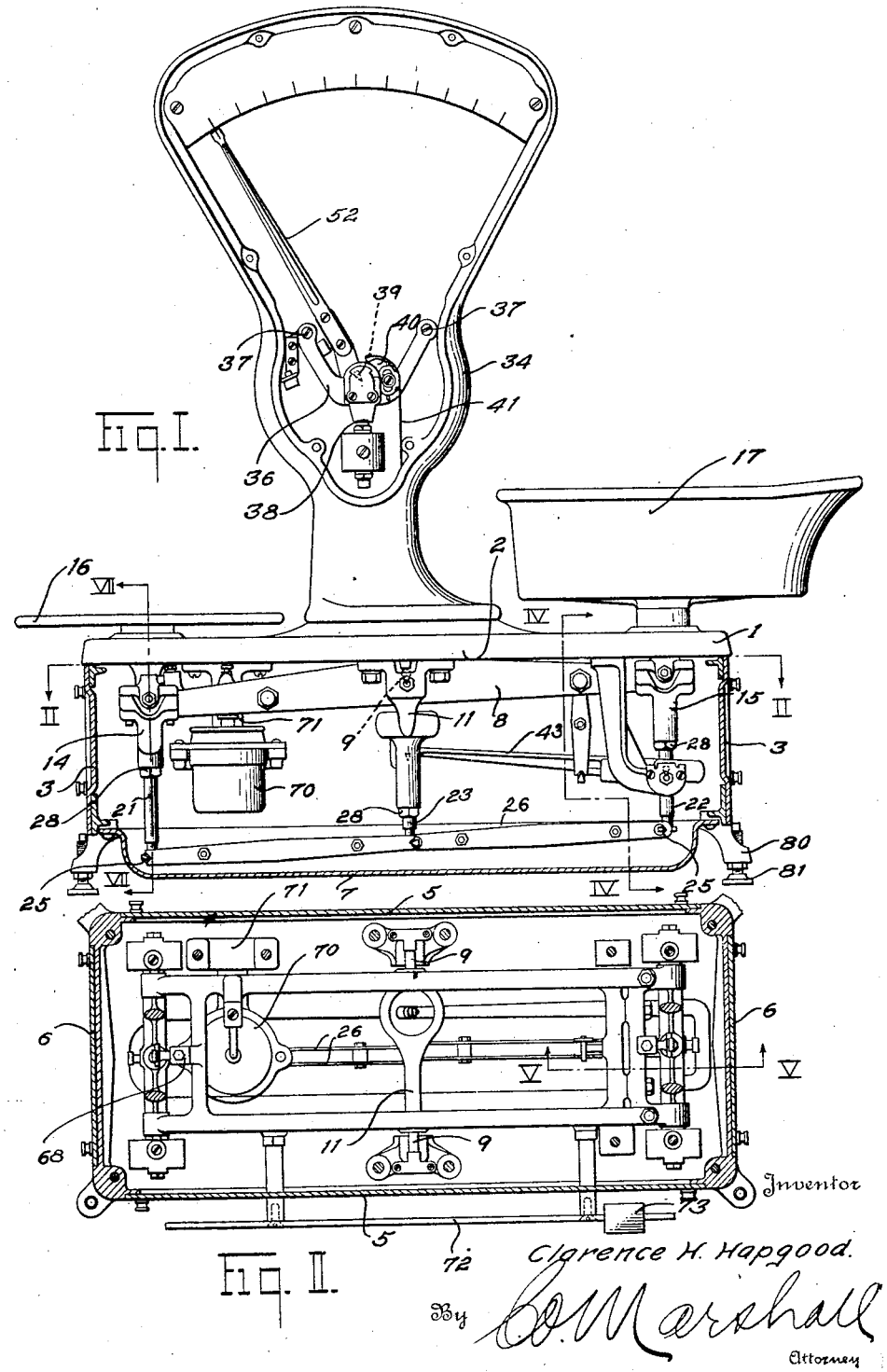

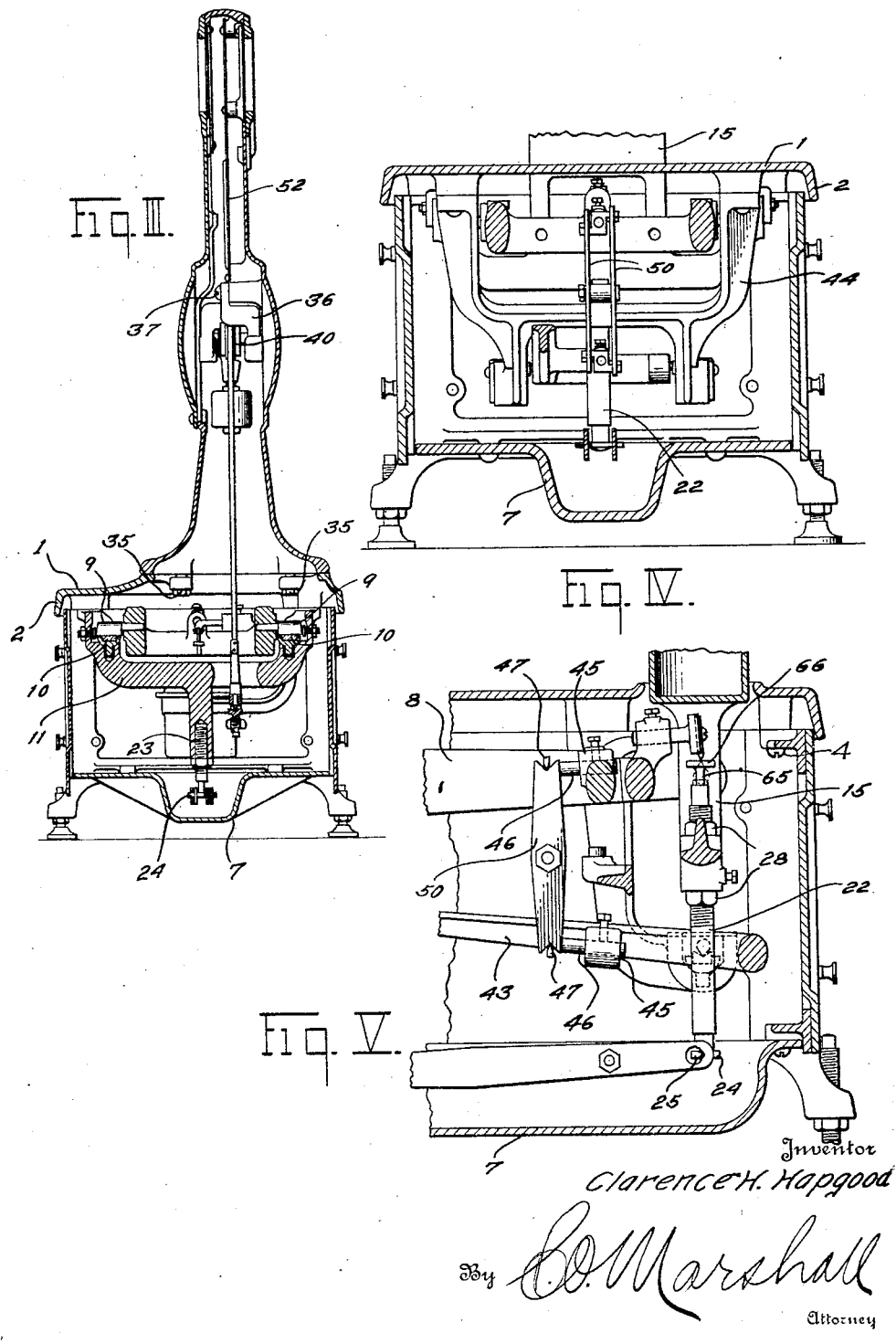

1,671,286

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed July 19, 1924. Serial No. 726,971.

This invention relates to weighing scales, and particularly to scales of the even balance type having automatic counterbalancing and indicating means for loads constituting a part only of the capacity of the scale.

One of the principal objects of the invention is the provision of a scale having an indicator which may be turned so as to render it readable from different positions.

Another object is the provision of means whereby the indicator may be turned without materially affecting the weighing mechanism or requiring the substitution of parts.

Another object is the provision of a scale of this type in which the connection from the commodity supporting levers to the automatic load-counterbalancing mechanism is such as to render the automatic mechanism responsive to very small changes in the load on the scale.

Another object is the provision of means for preventing the platform spiders from shifting on their pivots.

Another object is the provision of a scale of this type in which the mechanism is very accessible.

Another object is the provision of a housing from which the sides and ends may be removed for inspection and adjustment of the weighing mechanism.

Still another object is the provision of easily operated means for adjusting the weighing mechanism.

And still another object is the provision of a weighing scale of this type having a comparatively great capacity and a high degree of sensitiveness, the mechanism of which is simple and compactly arranged and the housing is of neat and pleasing appearance.

Other objects and advantages will be apparent from the following description, in which reference is had to the accompanying drawings illustrating a preferred embodiment of my invention and wherein similar reference numerals designate similar parts throughout the several views.

In the drawings:

Figure I is a front elevational view of the scale of my invention, parts being removed and parts shown in section;

Figure II is a sectional plan view taken substantially on the line II—II of Figure I;

Figure III is a vertical sectional view taken substantially through the turning axis of the automatic counterbalancing and indicating mechanism;

Figure IV is an enlarged transverse sectional view taken substantially on the line IV—IV of Figure I;

Figure V is an enlarged fragmentary sectional elevational view taken substantially on the line V—V of Figure II;

Figure VI is a top plan view of the scale showing the housing for the automatic mechanism in one position in full lines and in another position in dotted lines;

Figure VII is an enlarged transverse sectional view taken substantially on the line VII—VII of Figure I;

Figure VIII is an enlarged fragmentary detail view showing a connection at the end of one of the levers; and Figure IX is an enlarged fragmentary detail view of one end of the main lever of the scale showing a part of the scale adjusting means.

Referring to the drawings in detail, the levers and other movable mechanism of the scale are hung below and supported by a rectangular plate 1 provided at its edges with a downwardly turned flange 2. The plate is supported at its ends by a pair of skeleton frames 3 which are fixedly secured to the plate by means of screws 4.

To the frames 3 are secured side closure plates 5 and end closure plates 6 and a bottom plate 7 which are removably held in place by means of knurled screws and which with the top plate 1 constitute a rectangular box-like housing and enclose the lever mechanism of the scale.

The main lever 8 of the scale is fulcrumed on pivots 9 which are located midway between its ends and which rest in bearings 10 supported in recesses in a bracket 11 which is fixed to the lower side of the plate 1.

The lever 8 is provided at each of its ends with knife edge pivots 13 upon which are pivotally mounted spiders 14 and 15, a weight-receiving platter 16 being secured to and supported upon an upwardly projecting portion of the spider 14 which extends through an opening in the plate 1, and a commodity-receiving pan 17 being similarly secured to and supported upon the spider 15. The spiders 14 and 15 are substantially identical in construction, each being provided with a pocket or loading box 19 adapted to receive shot 20 or other heavy material in such amounts as are necessary to balance or seal the scale.

In order to maintain the level of the weight-receiving platter and commodity-receiving pan, I have provided the spiders 14 and 15 with adjustable downwardly extending posts 21 and 22 and the bracket 11 with an adjustable downwardly extending post 23. The posts 21, 22 and 23 have reduced end portions to which are secured the plates 24 having diagonally projecting ears 25 provided with oppositely disposed knife edges.

Connecting the knife edges of the posts 21 and 23 is a pair of parallel links 26, one of which has a V-shaped notch at each end receiving respectively the knife edges of the posts 21 and 23 which extend toward each other, while the other has an eye at each end embracing respectively the knife edges of the posts 21 and 23 extending away from each other. A push-and-pull connection is thus provided so that movement of the lower ends of the posts toward or away from each other is prevented. A similar pair of links connects the lower end of the post 23 to the post 22. Since this type of check link is clearly shown and described in my Patent No. 1,253,239, dated January 15, 1918, I will not describe it in detail. The lines joining the several knife edges on the posts and the load and fulcrum pivots of the lever 8 form a parallelogram. The posts 21 and 22 are kept vertical during all weighing movements of the lever and the condition of level of the platter 16 and the pan 17 is thereby maintained. The posts 21, 22 and 23 are adjustable vertically and are held in adjusted position by means of lock nuts 28, so that the parallelogrammatic relation of the pivots may be easily secured and reliably maintained.

The plate 1 is provided adjacent its center with a raised portion, the upper surface of which is preferably machined or otherwise made smooth and plane, and mounted upon this raised portion is an upright fan-shaped housing 34 which is secured in place by means of screws 35.

The housing is provided with an interior bracket 36 held in place by means of screws 37, and the automatic load-counterbalancing device, which consists of a pendulum 38, is pivotally supported on the bracket 36 by means of knife edge pivots 39. A sector 40 forms part of the pendulum structure and is connected by means of a flexible metallic ribbon 41, a portion of which overlies the arcuate face of the sector, to a stirrup 42 which is pivotally connected to the nose of an auxiliary lever 43. The auxiliary lever 43 is fulcrumed by means of knife edge pivots upon a bracket 44 which is fixed to the plate 1 in a position substantially below the commodity-receiving pan 17.

The main lever 8 and the auxiliary lever 43 are provided with bosses 45 bored to receive studs 46 which are provided with knife edge members 47 similar to the plates 24 which are secured to the lower ends of the posts 21, 22 and 23. A pair of links 50 similar in construction to the links 26 connects the knife edge members 47, thus forming a push-and-pull connection between the levers 8 and 43. It will be apparent that a load placed in the pan 17 will cause the right end of the lever 8 to swing downwardly and through the medium of the links 50 swing the auxiliary lever downwardly and cause a pull upon the ribbon 41 which will swing the load-counterbalancing pendulum 38 to the left and upwardly to a position in which the load, if it be within the capacity of the automatic counterbalance, will be counterbalanced.

Secured to the pendulum 38 is an indicator hand 52, the end of which swings below and in the plane of a suitably graduated arcuate chart 53 which is mounted in the upper end of the fan-shaped housing 34. The indicator and chart thus co-operate to indicate the weight of a load in the pan if the load be within the capacity of the automatic counterbalance.

In groceries and markets where scales of this type are employed counter space is often at a premium and it is sometimes desirable in order to conserve counter space to place the scale crosswise of the counter. In order that the indicating chart may face the operator when the scale is placed in this position, the housing 34 is made so that it can be turned to the dotted line position shown in Figure VI. When it is desired to turn the housing to this position the screws 35 are removed and the housing turned through an angle of 90°, the stirrup 42 being turned about the axis of the cone pivot so that the ribbon 41 remains in a plane at right angles to the plane of movement of the load-counterbalancing mechanism. The screws 35 are again inserted in their openings and the housing thus secured in its new position.

The housing 34 is so mounted upon the plate 1 that the ribbon 41 lies along the axis about which the housing is turnable, and owing to the length of the ribbon connection and the relation of the parts it is usually possible to turn the housing without necessitating readjustment of the weighing mechanism in the new position of the load counterbalance and indicator.

In order to provide for adjustment of the pivot distances on the lever 8 the load pivots which support the commodity-receiving pan 17 are mounted upon a member 55 which is secured to the lever proper by means of screws 57. Projecting from the main lever 8 and overlying the member 55 are ears 58 having openings which receive screws 59 threaded into the member 55. With this construction all necessary adjustments of the position of the load pivots is possible. By means of the screws 59 it is possible to raise and lower the pivots and they may then be locked in place by means of the screws 57.

I have observed that loads which are not placed on the commodity-receiver directly above or nearly above the load pivots exert forces which act longitudinally of the lever and thus tend to shift the commodity receptacle bearings on the load pivots and in extreme positions of the load the displacement is often so great as to bring the spider into contact with the backs of the pivots or otherwise disarrange the mechanism to such an extent as to cause an error in the weight indication. I have in this scale provided means to overcome the liability of error through this cause which consists of an adjustable downwardly facing pivot mounted on the lever 8 by means of a boss 60 which forms an integral part of the member 55 and which is bored to receive a stud 62 provided at one end with a head 63 having a vertical slot therein adapted to snugly receive a knife edge plate 64. The plate 64 is slotted and is held in place by means of a screw fastened through the slot so that it may be adjusted upwardly or downwardly to bring its knife edge into alignment with the knife edges of the load pivots. The upper end of the post 22 extends through a portion of the spider 15 and is bored and internally threaded to receive a screw 65 having a hardened flat head 66. By raising or lowering the screw 65 the hardened upper surface of the head 66 may be brought substantially into engagement with the knife edge of the plate 64. The screw is held in this adjusted position by means of a lock nut as shown.

It will be apparent that any tendency of the commodity-receiver to move transversely of its pivots will necessarily result in a tendency of the spider to rise, which tendency will be prevented by engagement of the knife edge of the plate 64 with the head 66 of the screw 65. The construction of the end of the lever and the spider supporting the weight-receiver is substantially like that of the end of the lever and spider supporting the commodity-receiving pan except that the member supporting the boss 68 to which the knife edge plate is secured is an integral part of the main lever 8.

For the purpose of damping the oscillations of the mechanism I have provided a dash pot 70, consisting of a cylinder closed at its lower end and containing a fluid, preferably oil, and a plunger (not shown) which is immersed in the oil and is pivotally connected by means of a plunger stem to the lever 8. The dash pot is supported by a bracket 71 which is secured to the lower side of the cover plate 1.

If desired, the lever may be provided with a tare beam 72 and a poise 73 (see Figure II) for the purpose of increasing the capacity of the scale without using loose weights or for counterbalancing containers. By placing loose weights upon the weight-receiving platter 16 the capacity of the scale may be increased to an extent limited only by the strength of the mechanism and the size of the weight-receiver and commodity-receiver. When loose weights are used, a part—usually the greater part of the load— is counterbalanced by the loose weights, which usually represent integral numbers of pounds or kilos, while the remaining or fractional part of the weight is counterbalanced by the load-counterbalancing pendulum and indicated by the indicator hand 52.

The frames 3 are provided with outwardly extending feet 80 having threaded openings adapted to receive screws 81 which may be adjusted to bring the scale to proper level.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, an equal arm lever fulcrumed thereon, a commodity receiver supported on one end of said lever, a weight receiver supported on the other end thereof, an auxiliary lever fulcrumed at one end on said frame and having its opposite end extending to a point adjacent the fulcrum of the first said lever, a connection between the first said lever and an intermediate point on said auxiliary lever, automatic load-counterbalancing mechanism, and means connecting said auxiliary lever and said automatic load-counterbalancing mechanism.

2. In a device of the class described, in combination, a frame, an even arm lever fulcrumed thereon, an auxiliary lever fulcrumed on said frame, means connecting said even arm lever and said auxiliary lever, automatic load-counterbalancing mechanism, turnable means supporting said automatic load-counterbalancing mechanism on said frame, and a connection from said auxiliary lever to said automatic load-counterbalancing mechanism, said connection lying along the turning axis of said turnable support.

3. In a device of the class described, in combination, a frame, an even arm lever fulcrumed thereon, a commodity receiver carried by one end of said even arm lever, a weight receiver carried by the other end thereof, an auxiliary lever fulcrumed on said frame adjacent the end of the first said lever supporting said commodity receiver, an operative connection between the first said lever and said auxiliary lever, the nose of said auxiliary lever being adjacent the fulcrum of the first said lever, automatic load-counterbalancing and indicating mechanism, means turnably mounted on said frame and supporting said automatic mechanism, and a connection from said auxiliary lever to said automatic load-counterbalancing and indicating mechanism, said connection lying along the axis about which said automatic load-counterbalancing and indicating mechanism support is turnable.

4. In a device of the class described, in combination, a frame, an upright housing mounted on said frame, lever mechanism supported on said frame, commodity and weight receivers supported by said lever mechanism, automatic weighing and indicating mechanism supported in said housing, and means connecting said automatic weighing and indicating mechanism to said lever mechanism, said upright housing being turnable to render said indicating mechanism readable from a plurality of positions.

5. In a device of the class described, in combination, a frame, an even arm lever fulcrumed thereon, an upright housing turnably mounted on said frame, automatic load-counterbalancing mechanism mounted in said housing, and connections from said automatic load-counterbalancing mechanism to said even arm lever.

6. In a weighing scale, in combination, a lever, a knife edge pivot on said lever by means of which said lever is fulcrumed on said frame, load pivots on said lever, commodity and weight receivers supported upon said load pivots, means for adjusting one of said load pivots to bring its edge into proper relation to a plane passing through the other of said load pivots and said fulcrum pivot, and means for adjusting one of said load pivots to vary its distance from said fulcrum pivot.

7. In a weighing scale, in combination, a frame, a lever fulcrumed on said frame, a pivot in said levers, a receiver supported upon said pivot, means including a sharp member for retaining said receiver on its supporting pivot, and means for adjusting said sharp member to bring its apex substantially into coincidence with a line lying along the edge of said knife edge pivot.

8. In a weighing scale, in combination, a frame, an even arm lever fulcrumed thereon, commodity and weight receivers pivotally supported upon said even arm lever, automatic load-counterbalancing mechanism supported by said frame, an auxiliary lever, a connection between said auxiliary lever and said automatic load-counterbalancing mechanism, and a push-and-pull connection between said even arm lever and said auxiliary lever.

9. In a weighing scale, in combination, a frame, an even arm lever fulcrumed thereon, weight and commodity receivers supported by said even arm lever, an auxiliary lever, automatic load-counterbalancing mechanism supported by said frame, a connection between said auxiliary lever and said automatic load-counterbalancing mechanism, a push-and-pull connection between said even arm lever and said auxiliary lever, and a beam and poise carried by said even arm lever.

10. In a weighing scale, in combination, a frame, a main lever fulcrumed on said frame, weight and commodity receivers supported by said main lever, an auxiliary lever fulcrumed on said frame, automatic load-counterbalancing and indicating mechanism, a flexible connection between said auxiliary lever and said automatic load-counterbalancing and indicating mechanism, and a push-and-pull connection between said main and auxiliary levers.

11. In a weighing scale, in combination, a frame, a main lever fulcrumed on said frame, weight and commodity receivers supported by said main lever, an auxiliary lever fulcrumed on said frame, automatic load-counterbalancing and indicating mechanism, a flexible connection between said auxiliary lever and said automatic load-counterbalancing and indicating mechanism, a push-and-pull connection between said main and auxiliary levers, and a beam and poise carried by said main lever.

12. In a weighing scale, in combination, a frame, a main lever fulcrumed thereon, an auxiliary lever fulcrumed on said frame, and a connection between said main and auxiliary levers comprising knife edge members carried by said levers, tension and compression members connecting said knife edge members, and means for adjusting the position of said knife edge members.

13. In a weighing scale, in combination, a plate, skeleton frames supporting said plate, a turnable upright housing supported on said plate, automatic load-counterbalancing and indicating mechanism supported within said turnable housing, lever mechanism supported by said plate and lying therebelow, a connection from said automatic load-counterbalancing and indicating mechanism to said lever mechanism, said connection being capable of functioning with said turnable housing in a plurality of positions, weight and commodity receivers supported by said lever mechanism and lying above said plate, and a plurality of additional plates secured to said skeleton frames and enclosing said lever mechanism.

CLARENCE H. HAPGOOD.